United States Patent
Zablow

(10) Patent No.: US 11,350,606 B2
(45) Date of Patent: Jun. 7, 2022

(54) ANIMAL PROTECTIVE HARNESS AND COLLAR

(71) Applicant: Yanit Hennie Zablow, Pittsburgh, PA (US)

(72) Inventor: Yanit Hennie Zablow, Pittsburgh, PA (US)

(*) Notice: Subject to any disclaimer, the term of this patent is extended or adjusted under 35 U.S.C. 154(b) by 481 days.

(21) Appl. No.: 16/004,186

(22) Filed: Jun. 8, 2018

(65) Prior Publication Data

US 2019/0104704 A1    Apr. 11, 2019

Related U.S. Application Data

(60) Provisional application No. 62/569,928, filed on Oct. 9, 2017.

(51) Int. Cl.
*A01K 13/00* (2006.01)
*A01K 27/00* (2006.01)

(52) U.S. Cl.
CPC .......... *A01K 13/006* (2013.01); *A01K 27/001* (2013.01); *A01K 27/002* (2013.01)

(58) Field of Classification Search
CPC ................................ A01K 13/006; A61D 9/00
See application file for complete search history.

(56) References Cited

U.S. PATENT DOCUMENTS

| | | | | |
|---|---|---|---|---|
| 918,796 A * | 4/1909 | Tilden | ........................ | B68B 1/04 54/80.1 |
| 2,513,969 A * | 7/1950 | Rose | .................... | A01K 13/006 119/850 |
| 3,248,852 A * | 5/1966 | Schwartz | ............. | A01K 13/006 54/79.1 |
| 3,742,679 A * | 7/1973 | Jordan | ................. | A01K 13/006 54/79.1 |
| 4,305,243 A * | 12/1981 | Yu | ........................ | A01K 13/006 54/80.4 |
| 4,799,458 A * | 1/1989 | Goshorn | ............... | A01K 13/006 119/815 |
| 5,197,414 A * | 3/1993 | Kanakura | ............. | A01K 13/006 119/815 |
| 5,787,842 A * | 8/1998 | Shmoldas | ............ | A01K 13/006 119/856 |

(Continued)

FOREIGN PATENT DOCUMENTS

DE    19629581 A1 *   1/1998   ........... A01K 13/006

*Primary Examiner* — David J Parsley
*Assistant Examiner* — Morgan T Barlow
(74) *Attorney, Agent, or Firm* — The Webb Law Firm

(57) ABSTRACT

A protective animal harness has a collar portion having a substantially annular shape with a first central opening configured for receiving a neck of an animal. The harness further has a torso portion having a substantially annular shape with a second central opening configured for receiving a torso of the animal. The harness further has a connecting strap connecting at least a portion of the collar portion to the torso portion and configured to extend between the front legs of the animal. A protective apron is connected to the collar portion. The protective apron has an arcuate shape that extends over a portion of a circumference of the collar portion. The protective apron has a flexible covering extending between a plurality of radially spaced apart reinforcement members.

12 Claims, 5 Drawing Sheets

(56) References Cited

U.S. PATENT DOCUMENTS

| | | | | |
|---|---|---|---|---|
| 5,996,537 A * | 12/1999 | Caditz | A01K 13/008 | 119/850 |
| 6,267,083 B1 * | 7/2001 | Chimienti | A01K 13/006 | 119/850 |
| 6,367,424 B1 * | 4/2002 | Higham | A01K 13/006 | 119/766 |
| 6,925,966 B1 * | 8/2005 | Wexler | A01K 13/006 | 119/814 |
| 8,042,494 B2 * | 10/2011 | Markfield | A61D 9/00 | 119/815 |
| 8,707,909 B2 * | 4/2014 | Bordeaux | A01K 13/006 | 119/850 |
| 9,374,983 B1 * | 6/2016 | Kuehr | A01K 13/006 | |
| 10,624,318 B2 * | 4/2020 | Bolton | A61D 9/00 | |
| 2003/0150401 A1 * | 8/2003 | Schmid | A01K 13/006 | 119/815 |
| 2003/0177984 A1 * | 9/2003 | Newman | A01K 15/027 | 119/850 |
| 2005/0263101 A1 * | 12/2005 | Jenny | A01K 27/005 | 119/792 |
| 2006/0278177 A1 * | 12/2006 | Crawford | A01K 13/006 | 119/850 |
| 2009/0090307 A1 * | 4/2009 | Heister | A61D 9/00 | 119/821 |
| 2010/0024745 A1 * | 2/2010 | Harlow | A01K 13/006 | 119/856 |
| 2010/0043725 A1 * | 2/2010 | Hall | A01K 13/006 | 119/850 |
| 2010/0206247 A1 * | 8/2010 | Cheng | A01K 13/006 | 119/850 |
| 2011/0139091 A1 * | 6/2011 | Ohashi | A01K 13/006 | 119/821 |
| 2011/0297107 A1 * | 12/2011 | Kostelec | A01K 13/006 | 119/850 |
| 2012/0145093 A1 * | 6/2012 | Martinez | A61D 9/00 | 119/863 |
| 2013/0055968 A1 * | 3/2013 | Lippincott | A01K 13/006 | 119/821 |
| 2014/0224189 A1 * | 8/2014 | Hamilton | A61D 9/00 | 119/855 |
| 2015/0053147 A1 * | 2/2015 | Lippincott | A61D 9/00 | 119/821 |
| 2016/0000040 A1 * | 1/2016 | Markfield | A01K 27/001 | 119/815 |
| 2017/0280681 A1 * | 10/2017 | Jurgens | A01K 15/04 | |
| 2018/0055008 A1 * | 3/2018 | Yun | A01K 13/006 | |
| 2018/0116175 A1 * | 5/2018 | Lui | A01K 27/001 | |
| 2018/0160651 A1 * | 6/2018 | Holt | A01K 27/008 | |

* cited by examiner

ANIMAL PROTECTIVE HARNESS AND COLLAR

CROSS-REFERENCE TO RELATED APPLICATIONS

This application claims priority to U.S. Provisional Application No. 62/569,928, filed on Oct. 9, 2017 and titled "Animal Protective Collar", the disclosure of which is incorporated herein by reference in its entirety.

BACKGROUND OF THE INVENTION

Field of the Invention

The present disclosure relates generally to an animal protective collar and harness. More specifically, the disclosure relates to an animal protective collar and harness having features to prevent the animal wearing the collar from reaching parts of its body intended to be protected by the protective collar.

Description of Related Art

When some animals sustain an injury or undergo a surgical procedure, they often tend to lick or bite an affected area of their body to soothe the discomfort associated with the injury or the surgical procedure. For example, dogs and cats often lick or bite stitches after undergoing a spaying or neutering procedure. Such licking and/or biting is undesirable because it hinders the healing process in the affected area.

Within the prior art, various devices have been developed to prevent the animal from licking or biting the affected area in order to promote proper healing. For example, protective collars, generally known as "Elizabethan collars", are placed around the animal's neck to physically obstruct the animal's mouth to the affected area. An Elizabethan collar is typically made from a flexible sheet material that surrounds the animal's neck and defines a cone-shaped structure that envelops the head. The cone-shaped structure is interposed between the animal's mouth and the affected area when the animal attempts to lick or bite the affected area.

While conventional Elizabethan collars are effective in preventing animals from engaging the affected area, they are associated with a number of disadvantages that hinder the animal's mobility and increase the animal's discomfort. Due to their cone-shape that envelops the animal's head, Elizabethan collars limit the animal's field of view, often making the animal collide with objects that they would normally avoid. Some animals may feel threatened, disturbed, or disoriented while wearing the Elizabethan collar. Elizabethan collars also make it difficult for the animal to eat or drink because the collar may extend past the animal's head and prevent the animal's mouth from accessing food or water.

While various devices for preventing animals from licking or biting an affected area are known in the art, improvements in the design of such devices are highly desirable. In particular, it would be desirable to provide improved animal protective collars that overcome the disadvantages associated with conventional protective collars.

SUMMARY OF THE DISCLOSURE

The present disclosure generally relates to an improved animal protective collar and harness that overcomes the deficiencies associated with conventional protective collars.

In some preferred and non-limiting embodiments or examples, a protective animal harness may have a collar portion having a substantially annular shape with a first central opening configured for receiving a neck of an animal, a torso portion having a substantially annular shape with a second central opening configured for receiving a torso of the animal, a connecting strap connecting at least a portion of the collar portion to the torso portion and configured to extend between the front legs of the animal, and a protective apron connected to the collar portion. The protective apron may have an arcuate shape that extends over a portion of a circumference of the collar portion.

In other preferred and non-limiting embodiments or examples, the protective apron may have a flexible covering extending between a plurality of radially spaced apart reinforcement members. Each of the plurality of reinforcement members may be positioned within a pocket formed on the flexible covering. Each of the plurality of reinforcement members may be flexible. The protective apron may be removably connected to the collar portion by a connection mechanism. The connection mechanism may be a hook-and-loop fastener having a first member on the collar portion and a second member on the protective apron. The collar portion may have a first end and a second end removably connectable to the first end at a collar joint by a first connection element. The first connection element may be a clasp, a snap connector, or a hook-and-loop connector. The collar portion may have a first adjustment mechanism on at least one of the first end and the second end for adjusting a circumferential length of the collar portion. The torso portion may have a first end and a second end removably connectable to the first end at a torso joint by a second connection element. The second connection element may be a clasp, a snap connector, or a hook-and-loop connector. The torso portion may have a second adjustment mechanism on at least one of the first end and the second end for adjusting a circumferential length of the torso portion. The connection strap may have a strap adjustment mechanism for adjusting a longitudinal length of the connection strap.

In other preferred and non-limiting embodiments or examples, a protective animal collar may have a collar portion having a first end and a second end removably connectable to the first end at a collar joint to define a substantially annular shape with a central opening configured for receiving a neck of an animal, and a protective apron connected to the collar portion. The protective apron may have an arcuate shape that extends over a portion of a circumference of the collar portion. The protective apron may have a flexible covering extending between a plurality of radially spaced apart reinforcement members.

In other preferred and non-limiting embodiments or examples, the protective apron may be removably connected to the collar portion by a connection mechanism. The connection mechanism may be a hook-and-loop fastener having a first member on the collar portion and a second member on the protective apron. The collar joint may have an adjustment mechanism for adjusting a size of the central opening. The adjustment mechanism may be a hook-and-loop fastener having a first member on the first end of the collar portion and a second member on the second end of the collar portion. The collar portion may be made from a foam material. The foam material may be enveloped in a fabric material.

In accordance with further embodiments of the present invention, various aspects of animal protective collars and harnesses can be characterized by one or more of the following clauses:

Clause 1. A protective animal harness comprising: a collar portion having a substantially annular shape with a first central opening configured for receiving a neck of an animal; a torso portion having a substantially annular shape with a second central opening configured for receiving a torso of the animal; a connecting strap connecting at least a portion of the collar portion to the torso portion and configured to extend between the front legs of the animal; and a protective apron connected to the collar portion, the protective apron having an arcuate shape that extends over a portion of a circumference of the collar portion.

Clause 2. The protective animal harness of clause 1, wherein the protective apron has a flexible covering extending between a plurality of radially spaced apart reinforcement members.

Clause 3. The protective animal harness of clause 1 or clause 2, wherein each of the plurality of reinforcement members is positioned within a pocket formed on the flexible covering.

Clause 4. The protective animal harness of any of clauses 1-3, wherein each of the plurality of reinforcement members is flexible.

Clause 5. The protective animal harness of any of clauses 1-4, wherein the protective apron is removably connected to the collar portion by a connection mechanism.

Clause 6. The protective animal harness of any of clauses 1-5, wherein the connection mechanism is a hook-and-loop fastener having a first member on the collar portion and a second member on the protective apron.

Clause 7. The protective animal harness of any of clauses 1-6, wherein the collar portion comprises a first end and a second end removably connectable to the first end at a collar joint by a first connection element.

Clause 8. The protective animal harness of any of clauses 1-7, wherein the first connection element is a clasp, a snap connector, or a hook-and-loop connector.

Clause 9. The protective animal harness of any of clauses 1-8, wherein the collar portion comprises a first adjustment mechanism on at least one of the first end and the second end for adjusting a circumferential length of the collar portion.

Clause 10. The protective animal harness of any of clauses 1-9, wherein the torso portion comprises a first end and a second end removably connectable to the first end at a torso joint by a second connection element.

Clause 11. The protective animal harness of any of clauses 1-10, wherein the second connection element is a clasp, a snap connector, or a hook-and-loop connector.

Clause 12. The protective animal harness of any of clauses 1-11, wherein the torso portion comprises a second adjustment mechanism on at least one of the first end and the second end for adjusting a circumferential length of the torso portion.

Clause 13. The protective animal harness of any of clauses 1-12, wherein the connection strap comprises a strap adjustment mechanism for adjusting a longitudinal length of the connection strap.

Clause 14. A protective animal collar comprising: a collar portion having a first end and a second end removably connectable to the first end at a collar joint to define a substantially annular shape with a central opening configured for receiving a neck of an animal; and a protective apron connected to the collar portion, the protective apron having an arcuate shape that extends over a portion of a circumference of the collar portion, wherein the protective apron has a flexible covering extending between a plurality of radially spaced apart reinforcement members.

Clause 15. The protective animal collar of clause 14, wherein the protective apron is removably connected to the collar portion by a connection mechanism.

Clause 16. The protective animal collar of clause 14 or clause 15, wherein the connection mechanism is a hook-and-loop fastener having a first member on the collar portion and a second member on the protective apron.

Clause 17. The protective animal collar of any of clauses 14-16, wherein the collar joint comprises an adjustment mechanism for adjusting a size of the central opening.

Clause 18. The protective animal collar of any of clauses 14-17, wherein the adjustment mechanism is a hook-and-loop fastener having a first member on the first end of the collar portion and a second member on the second end of the collar portion.

Clause 19. The protective animal collar of any of clauses 14-18, wherein the collar portion is made from a foam material.

Clause 20. The protective animal collar of any of clauses 14-19, wherein the foam material is enveloped in a fabric material.

The features that characterize the present invention are pointed out with particularity in the claims, which are annexed to and form a part of this disclosure. These and other features of the invention, its operating advantages, and the specific objects obtained by its use will be more fully understood from the following detailed description in which non-limiting examples of the invention are illustrated and described.

BRIEF DESCRIPTION OF THE DRAWINGS

In FIGS. 1-5, the same characters represent the same components unless otherwise indicated.

DESCRIPTION OF THE INVENTION

Figure 1:
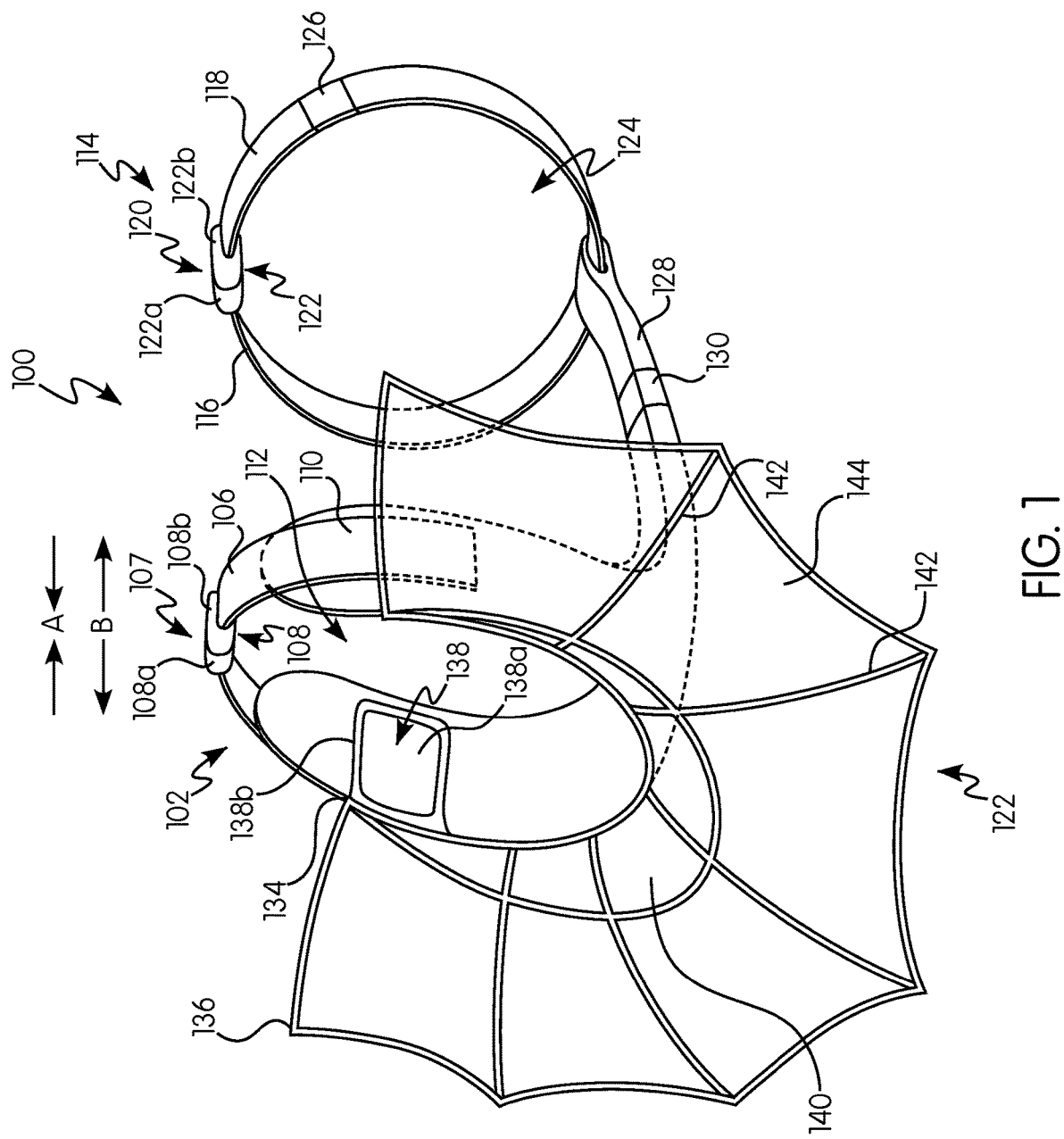
FIG. 1 is a perspective view of an animal protective harness in accordance with one example of the present disclosure.

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "adjacent" means proximate to but not in direct contact with.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

With reference to FIG. 1, the present disclosure is generally directed to a protective animal harness 100 (hereinafter referred to as "harness") is configured to be worn by a quadruped animal, such as a dog or a cat. In some examples, a first, or collar portion 102, of the harness 100 is configured to be worn around the animal's neck and a second, or torso portion 114, of the harness 100 is configured to be worn around at least a portion of the animal's torso between the front and hind legs. The harness 100 is configured to prevent the animal from licking or biting a part of its body that may be affected due to an injury or a surgical procedure in order to promote proper healing. For example, the harness 100 may be configured to prevent the animal from licking or biting a wound after a surgical procedure.

With continued reference to FIG. 1, the harness 100 has a collar portion 102 configured to extend around the animal's neck. The collar portion 102 has a first end 104 opposite a second end 106. The first end 104 and the second end 106 are connectable to each other to define a substantially annular shape of the collar portion 102. In some preferred and non-limiting embodiments or examples, the first end 104 and the second end 106 may be removably connectable with each other at a collar joint 107. In other preferred and non-limiting embodiments or examples, the first end 104 and the second end 106 may be permanently and non-removably connected to each other, such as by stitching or by being formed as a single continuous loop. The collar portion 102 may be made from a webbing material, a fabric material, a natural or synthetic leather material, or any other material. In various examples, the collar portion 102 may have a decorative appearance with a variety of colors, styles, fabrics, and prints available.

With continued reference to FIG. 1, the collar joint 107 may have a first connection element 108, such as a clasp, a snap connector, a hook-and-loop connector, or any other type of connection mechanism configured for allowing removable connection between the first end 104 and the second end 106 of the collar portion 102. In some preferred and non-limiting embodiments or examples, the first connection element 108 has a first portion 108a connected to the first end 104 of the collar portion 102 and a second portion 108b connected to the second end 106 of the collar portion 102. The first portion 108a and the second portion 108b of the first connection element 108 are connectable to each other, such as by moving the first portion 108a and the second portion 108b toward each other in a direction of arrows A, and disconnectable from each other, such as moving the first portion 108a and the second portion 108b away from each other in a direction of arrows B. When connected to each other, the first end 104 and the second end 106 define a substantially annular shape of the collar portion 102 with a first central opening 112. In use, the first central opening 112 is configured for receiving a neck of an animal (shown in FIG. 2).

With continued reference to FIG. 1, at least one of the first end 104 and the second end 106 of the collar portion 102 may have a first adjustment mechanism 110 for adjusting a circumferential length of the collar portion 102. In some preferred and non-limiting embodiments or examples, both the first end 104 and the second end 106 have the first adjustment mechanism 110. In other preferred and non-limiting embodiments or examples, only one of the first end 104 and the second end 106 has the first adjustment mechanism 110. The first adjustment mechanism 110 may be a buckle. The first adjustment mechanism 110 is configured for allowing an adjustment of the collar portion 102 to fit various neck sizes by adjusting the size of the first central opening 112. For example, the first adjustment mechanism 110 may allow for adjustment of the size of the first central opening 112 based on an overall circumferential length of the collar portion 102 between 5.75 inches to 25 inches.

With continued reference to FIG. 1, the harness 100 has a torso portion 114 configured to extend around the animal's torso between the front legs and the hind legs. The torso portion 114 has a first end 116 opposite a second end 118. The first end 116 and the second end 118 are connectable to each other to define a substantially annular shape of the torso portion 114. In some preferred and non-limiting embodiments or examples, the first end 116 and the second end 118 may be removably connectable with each other at a torso joint 120. In other preferred and non-limiting embodiments or examples, the first end 116 and the second end 118 may be permanently and non-removably connected to each other, such as by stitching or by being formed as a single continuous loop. The torso portion 114 may be made from a webbing material, a fabric material, a natural or synthetic leather material, or any other material. In various examples, the torso portion 114 may have a decorative appearance with a variety of colors, styles, fabrics, and prints available.

With continued reference to FIG. 1, the torso joint 114 may have a second connection element 122, such as a clasp, a snap connector, a hook-and-loop connector, or any other type of connection mechanism configured for allowing removable connection between the first end 116 and the second end 118 of the torso portion 114. In some preferred and non-limiting embodiments or examples, the second connection element 122 has a first portion 122a connected to the first end 116 of the torso portion 114 and a second portion 122b connected to the second end 118 of the torso portion 114. The first portion 122a and the second portion 122b of the second connection element 122 are connectable to each other, such as by moving the first portion 122a and the second portion 122b toward each other in a direction of arrow A, and disconnectable from each other, such as moving the first portion 122a and the second portion 122b away from each other in a direction of arrow B. When connected to each other, the first end 116 and the second end 118 define a substantially annular shape of the torso portion 114 with a second central opening 124. In use, the second central opening 124 is configured for extending around a torso of an animal (shown in FIG. 2).

With continued reference to FIG. 1, at least one of the first end 116 and the second end 118 of the torso portion 114 may have a second adjustment mechanism 126 for adjusting a circumferential length of the torso portion 114. In some preferred and non-limiting embodiments or examples, both the first end 114 and the second end 116 have the second adjustment mechanism 126. In other preferred and non-limiting embodiments or examples, only one of the first end 116 and the second end 118 has the second adjustment mechanism 126. The second adjustment mechanism 126 may be a buckle. The second adjustment mechanism 126 is configured for allowing an adjustment of the torso portion 114 to fit various torso sizes by adjusting the size of the second central opening 124. For example, the second adjustment mechanism 126 may allow for adjustment of the size of the second central opening 124 based on an overall circumferential length of the torso portion 114 between 5 inches to 35 inches.

Figure 2:
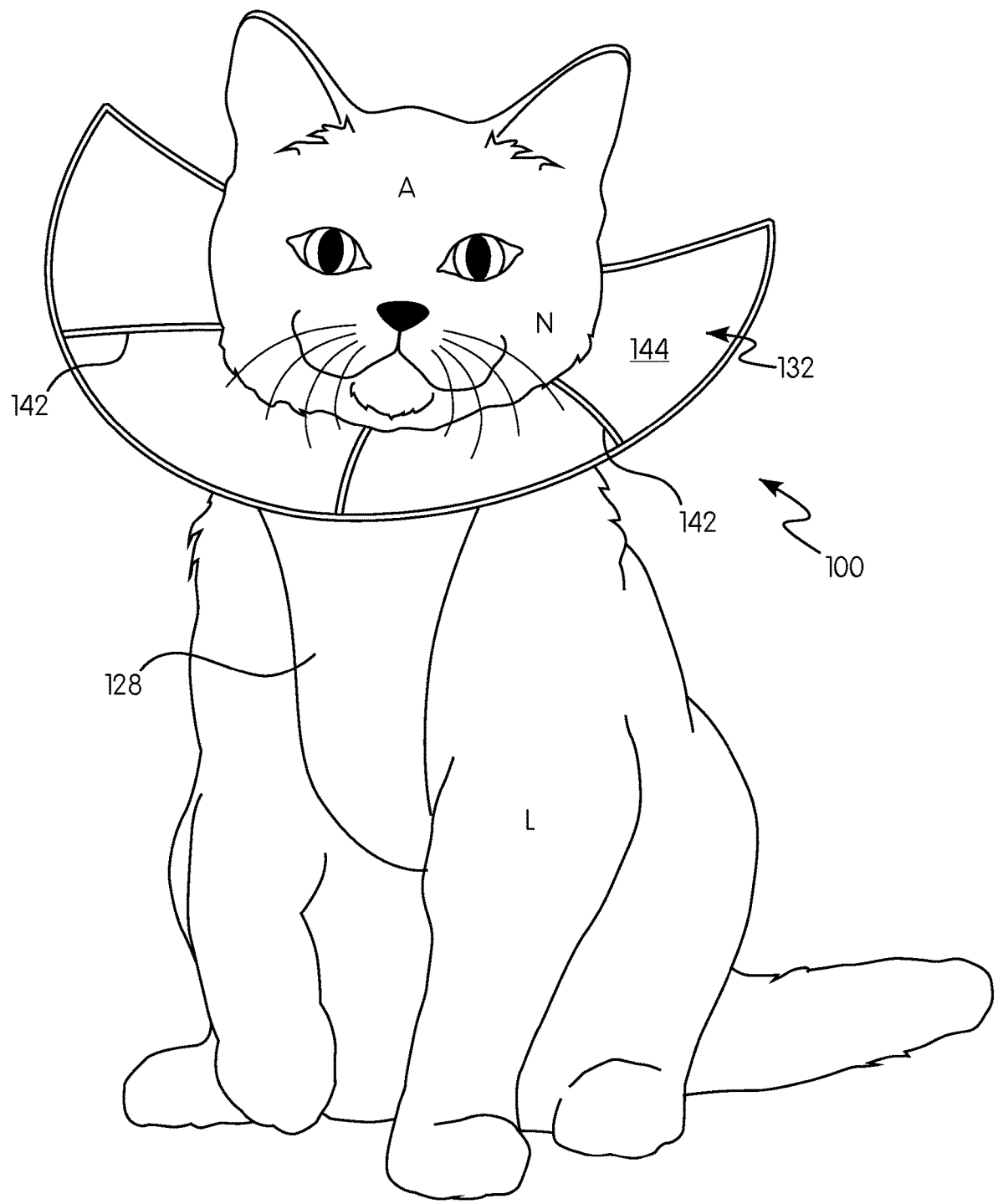
FIG. 2 is a perspective view of an animal wearing the protective harness shown in FIG. 1.

With continued reference to FIG. 1, the collar portion 102 and the torso portion 114 are connected together by a connection strap 128. When the harness 100 is worn by an animal A, such as shown in FIG. 2, the connection strap 128 may extend along at least a portion of the animal's back or at least a portion of the animal's chest and/or abdomen. The connection strap 128 is dimensioned such that it can extend between the animal's front legs L (see FIG. 2). Due to its placement between the animal's front legs L, the connection strap 128 prevents twisting or rotation of the collar portion 102 about the animal's neck N or the torso portion 114 about the animal's torso T. In some preferred and non-limiting embodiments or aspects, a pair of connection straps 128 may be provided, with a first connection strap 128 extending along the animal's back and the second connection strap 128 extending along the animal's chest and/or abdomen.

In some preferred and non-limiting embodiments or aspects, the collar portion 102 and the torso portion 114 are removably connected together by the connection strap 128. For example, the connection strap 128 may be removably connected to at least one of the collar portion 102 and the torso portion 114. In other preferred and non-limiting embodiments or aspects, the collar portion 102 and the torso portion 114 are non-removably connected together by the connection strap 128. For example, the connection strap 128 may be non-removably connected to both the collar portion 102 and the torso portion 114. The connection strap 128 may be made from a webbing material, a fabric material, a natural or synthetic leather material, or any other material. In various examples, the connection strap 128 may have a decorative appearance with a variety of colors, styles, fabrics, and prints available.

With continued reference to FIG. 1, the connection strap 128 may have a strap adjustment mechanism 130 for adjusting a longitudinal length of the connection strap 128. In some preferred and non-limiting embodiments or examples, the strap adjustment mechanism 130 may be a buckle. The strap adjustment mechanism 130 is configured for allowing an adjustment of the longitudinal length of the strap in a direction of arrow C in order to position the torso strap 114 at a desired position on the animal's torso. For example, the strap adjustment mechanism 130 may allow for adjustment of the longitudinal length of the connection strap 128 between 5 inches to 35 inches.

With continued reference to FIG. 1, the harness 100 has a protective apron 132 connected to at least a portion of the collar portion 102. In some preferred and non-limiting embodiments or examples, the protective apron 132 is connected to collar portion 102 and extends along at least a portion of a circumference of the collar portion 102 surrounding the first central opening 112. The protective apron 132 may have an arcuate shape that extends around a portion of the circumference of the collar portion 102. For example, the protective apron 132 may have a substantially semi-circular shape that extends in a semi-circular arc around a portion of an outer circumference of the collar portion 102. At least a portion of the protective apron 132 extends radially away from the collar portion 102. The protective apron 132 may be positioned on the collar portion 102 opposite the collar joint 107.

With continued reference to FIG. 1, the protective apron 132 has an inner portion 134 that is connected to the collar portion 102 at the first central opening 112 and an outer portion 136 that extends radially outward from the inner portion 134 and the collar portion 102. In some examples, a terminal edge of the outer portion 136 of the protective apron 132 extends from about 4.5 inches to about 12.5 inches from the inner portion 134 and the collar portion 102.

The protective apron 132 may be removably or non-removably connected to the collar portion 102 by a connection mechanism 138. In some preferred and non-limiting embodiments or examples, the protective apron 132 is removably connectable directly with the collar portion 102. In other preferred and non-limiting embodiments or examples, the protective apron 132 is removably connectable to a lip 140 on the collar portion 102. The lip 140 may be removably or non-removably formed with the collar portion 102. In some preferred and non-limiting embodiments or examples, the lip 140 may have an arcuate shape that extends around at least a portion of the circumference of the collar portion 102. Due to the removable connection of the protective apron 132 with the collar portion 102, the protective apron 132 may be easily removed from the collar portion 102 for cleaning or repair, or be exchanged for a second protective apron 132.

In some preferred and non-limiting embodiments or examples, the connection mechanism 138 may be a hook-and-loop fastener having a first member 138a on the collar portion 102 or the lip 140 and a second member 138b on the protective apron 132. The protective apron 132 can be removably attached to the collar portion 102 or the lip 140 by aligning the first member 138a of the connection member 138 on the collar portion 102 or the lip 140 with the second member 138b on the protective apron 132. In other examples, the connection mechanism 138 may be any connection means that allows removable connection between the protective apron 132 and the collar portion 102 or the lip 140. For example, the connection mechanism 138 may be a magnetic, adhesive, or mechanical fastener that allows for removable connection between the protective apron 132 and the collar portion 102 or the lip 140.

With continued reference to FIG. 1, the protective apron 132 has a plurality of reinforcement members 142 connected together by a flexible covering 144. In some examples, each reinforcement member 142 may be a resiliently flexible element that may be bent from a first position to a second position, and then revert back to the first position after the bending force is removed. In some examples, the reinforcement element 142 may be a metal wire. In this manner, the plurality of reinforcement members 142 define an overall structural shape of the protective apron 132 while allowing the protective apron 132 to bend, such as when the animal is feeding or sleeping. The plurality of reinforcement elements 142 may be arranged in a radially spaced apart manner. Each of the plurality of reinforcement elements 142 may have a first end 142a positioned at the inner portion 134 of the protective apron 132 and a second end 142b positioned at the outer portion 136 of the protective apron 132. The plurality of reinforcement elements 142 may be spaced apart from each other at equal or unequal intervals. The length of the reinforcement elements 142 between the first end 142a and the second end 142b may be constant, or it may vary, with some reinforcement elements 142 being longer or shorter than others. While not expressly illustrated, the protective apron 132 may have a reinforcement element 142 along at least one of the inner portion 134 and the outer portion 136. Individual reinforcement elements 142 may be connected to one another by at least one connection member (not shown) extending between adjacent reinforcement elements 142 between their respective first and second ends 142a, 142b.

With continued reference to FIG. 1, the flexible covering 144 of the protective apron 132 may be a fabric or plastic covering that extends between each of the reinforcement elements 142. In some examples, pockets (not shown) may be provided in the flexible covering 144. Each pocket may be configured for receiving at least one reinforcement element 142. The flexible covering 144 may be made from a waterproof material. In various examples, the flexible covering 144 may have a decorative appearance with a variety of colors, styles, fabrics, and prints available.

Having described the structure of the harness 100, a method of using the harness 100 will now be described. With reference to FIG. 1, the harness 100 can be attached to an animal's body by positioning the collar portion 102 around the animal's neck, such as by sliding the collar portion 102 around the animal's neck or by connecting the first end 104 and the second end 106 of the collar portion 102, such as by connecting the collar joint 107 to fit snugly around the animal's neck. The size of the collar portion 102 may be adjusted with the first adjustment mechanism 110. The torso portion 114 is fitted in a similar manner to surround the animal's torso due to the connection of the first end 116 to the second end 118 by the second connection element 122. The size of the torso portion 114 may be adjusted with the second adjustment mechanism 126. The connection strap 128 is positioned such that it extends along the animal's torso and between the animal's legs.

When the collar portion 102 and the torso portion 114 are attached to the animal's body, the protective apron 132 is positioned such that it extends from the front portion of the animal's neck, preferably under the animal's mouth. The harness 100 is configured to allow the animal to rotate the head without any obstruction to a peripheral field of vision. The flexibility of the protective apron 132 allows the animal to eat, sleep, and move about without impairing the animal's mobility or reducing comfort. The position of the protective apron 132 under the animal's mouth prevents the animal from biting or licking its body which may hinder the healing process.

Figure 3:
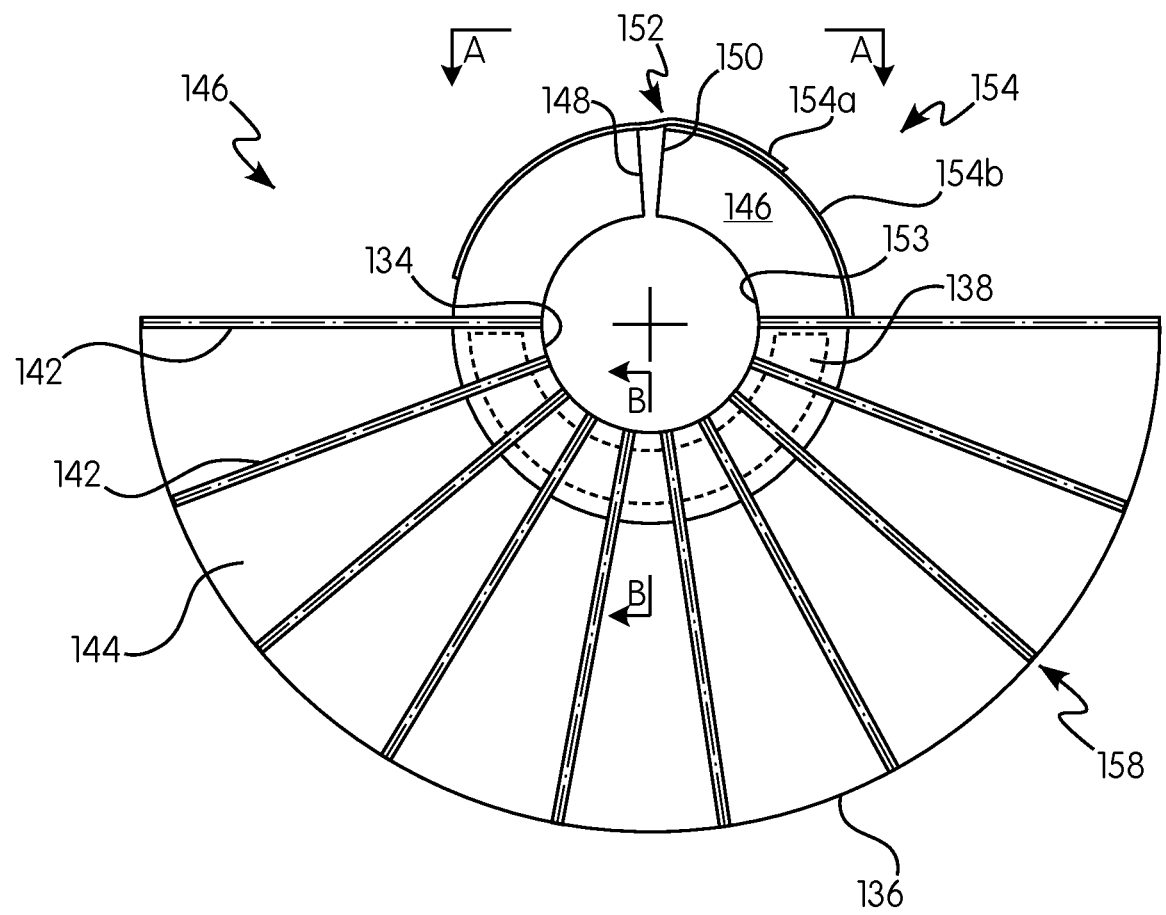
FIG. 3 is a top view of an animal protective collar in accordance with another example of the present disclosure.

With reference to FIG. 3, an animal protective collar 146 (hereinafter referred to as "collar 146") is shown in accordance with another embodiment or example of the present disclosure. Similar to the harness 100 shown in FIGS. 1-2, the collar 146 of FIG. 3 is configured to be worn by a quadruped animal, such as a dog or a cat. The collar 146 is configured to be worn around the animal's neck and prevent the animal from licking or biting a part of its body that may be affected due to an injury or a surgical procedure in order to promote proper healing. Many components of the collar 146 shown in FIG. 3 are substantially similar to the components of the harness 100 described herein with reference to FIG. 1. As the previous discussion regarding the harness 100 generally shown in FIG. 1 is applicable to the collar 146 shown in FIG. 3, only the relative differences between the harness 100 generally shown in FIG. 1 and the collar 146 generally shown in FIG. 3 are discussed hereinafter.

With reference to FIG. 3, the collar 146 is configured to be worn only around the animal's neck, rather than around the neck and the torso, as is the case with the harness 100 discussed herein with reference to FIG. 1. The collar 146 has a first end 148 opposite a second end 150. The first end 148 and the second end 150 are connectable to each other to define a substantially annular shape of the collar 146. In some preferred and non-limiting embodiments or examples, the first end 148 and the second end 150 may be removably connectable with each other at a collar joint 152. In other preferred and non-limiting embodiments or examples, the first end 148 and the second end 150 may be permanently and non-removably connected to each other, such as by stitching or by being formed as a single continuous loop.

With continued reference to FIG. 3, the collar joint 152 may have a connection element 154, such as a clasp, a snap connector, a hook-and-loop connector, or any other type of connection mechanism configured for allowing removable connection between the first end 148 and the second end 150 of the collar 146. In some preferred and non-limiting embodiments or examples, the connection element 154 has a first portion 154a connected to the first end 104 of the collar 146 and a second portion 154b connected to the second end 150 of the collar 146. When connected to each other, the first end 148 and the second end 150 define a substantially annular shape of the collar 146 with a central opening 153. In use, the central opening 153 is configured for receiving a neck of an animal.

Figure 4:
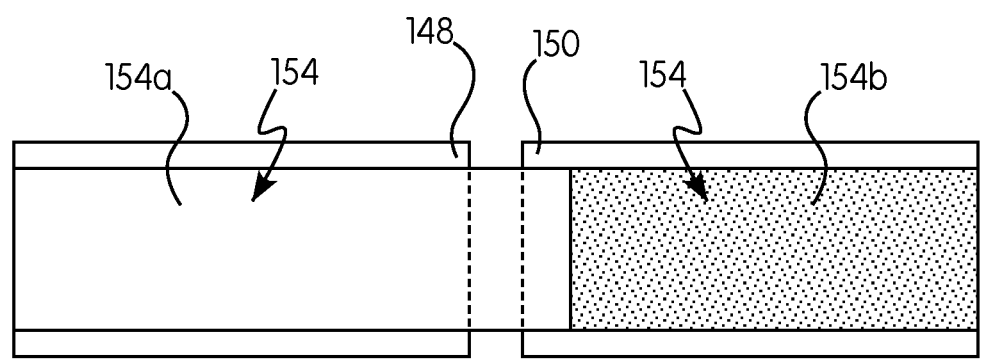
FIG. 4 is a side cross-sectional view of the animal protective collar shown in FIG. 3 taken along line A-A.

With reference to FIG. 4, at least one of the first end 148 and the second end 150 of the collar 146 may have a first adjustment mechanism 156 for adjusting a circumferential length of the collar 146. In some preferred and non-limiting embodiments or examples, both the first end 148 and the second end 150 have the first adjustment mechanism 156. In other preferred and non-limiting embodiments or examples, only one of the first end 148 and the second end 150 has the first adjustment mechanism 156. The first adjustment mechanism 156 may be a hook-and-loop fastener strap. The first adjustment mechanism 156 is configured for allowing an adjustment of the collar 146 to fit various neck sizes by adjusting the size of the central opening 152. For example, the first adjustment mechanism 156 may allow for adjustment of the size of the central opening 152 based on an overall circumferential length of the collar 146 between 5.75 inches to 25 inches.

With reference to FIG. 3, the collar 146 has a protective apron 158 connected to at least a portion of the collar 146. In some preferred and non-limiting embodiments or examples, the protective apron 158 is connected to the collar 146 and extends along at least a portion of a circumference of the collar 146 surrounding the central opening 153. The protective apron 158 may have an arcuate shape that extends around a portion of the circumference of the collar 146. The protective apron 158 may be substantially identical to the protective apron 132 described herein with reference to FIGS. 1-2.

Figure 5:
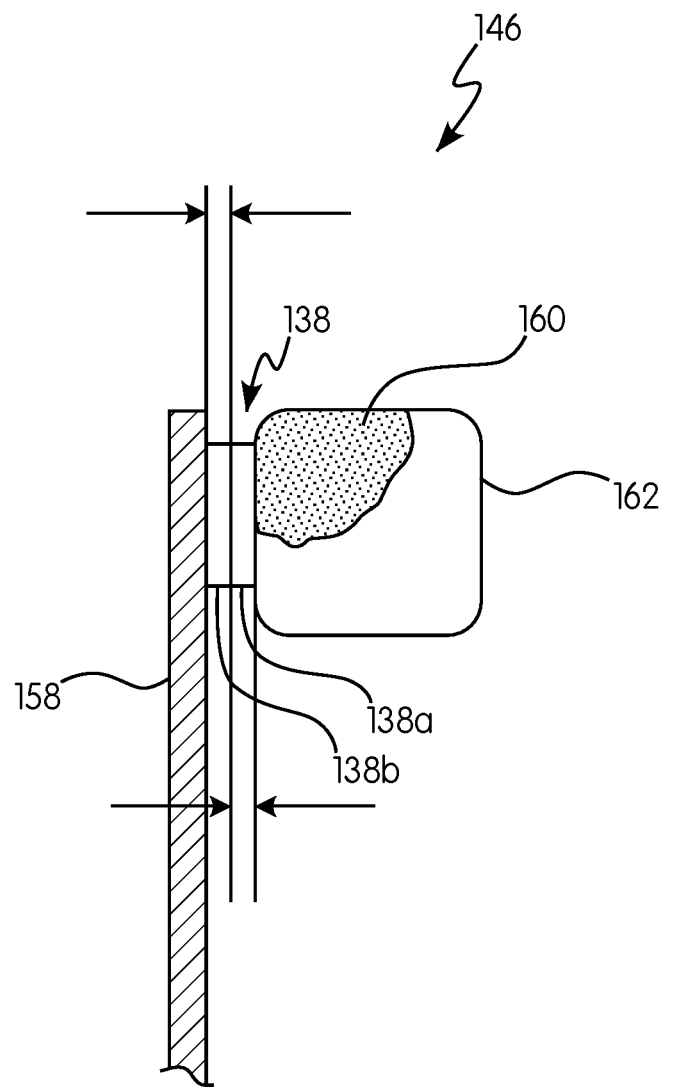
FIG. 5 is a side cross-sectional view of the animal protective collar shown in FIG. 3 taken along line B-B.

With reference to FIG. 5, the collar 146 is shown in a partially-exposed cross-sectional view taken along line B-B in FIG. 3. The collar 146 may have a substantially rectangular cross-section. In some examples, the collar 146 is made from a foam material 160, such as an open or closed cell foam material. The foam material 160 may be selected to have a desired firmness when touched. Desirably, the foam material 160 of the collar 146 is selected to conform tightly around the animal's neck. When worn by the animal, the collar 146 is configured to stay in place without rotation around the animal's neck. In some examples, the foam material 160 of the collar 146 has a covering 162 that partially or fully envelops the foam material 160. The covering 162 may be a soft fabric covering that is permanently installed on the foam material 160. In some examples, the covering 162 may be removable from the foam material 160 to allow the covering 162 to be cleaned. In various examples, the covering 162 may have a decorative appearance with a variety of colors, styles, fabrics, and prints available.

Having described the structure of the collar 146, a method of using the collar 146 will now be described. With reference to FIG. 3, the collar 146 can be attached to an animal's neck by disconnecting the first end 148 from the second end 150. Once the collar 146 is positioned around the animal's neck, the first end 148 and the second end 150 are connected together, such as by connecting the collar joint 152 to fit snugly around the animal's neck. The size of the collar 146 may be adjusted with the adjustment mechanism 156. When attached to the animal's neck, the protective apron 158 is positioned such that it extends from the front portion of the animal's neck, preferably under the animal's mouth. The collar 146 is configured to allow the animal to rotate the head without any obstruction to a peripheral field of vision. The flexibility of the protective apron 158 allows the animal to eat, sleep, and move about without impairing the animal's mobility or reducing comfort. The position of the protective apron 158 under the animal's mouth prevents the animal from biting or licking its body which may hinder the healing process.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the description. For example, it is to be understood that the present invention contemplates that, to the extent possible, one or more features of any embodiment can be combined with one or more features of any other embodiment.

I claim:

1. A protective animal harness comprising:
a collar portion having a substantially annular shape with a first central opening configured for receiving a neck of an animal, the collar portion comprising a first end and a second end removably connectable to the first end at a collar joint by a first connection element, a first adjustment mechanism on at least one of the first end of the collar portion and the second end of the collar portion for adjusting a circumferential length of the collar portion, and an arcuate lip extending around a portion of a circumference of the collar portion;
a torso portion having a substantially annular shape with a second central opening configured for receiving a torso of the animal, the torso portion comprising a first end and a second end removably connectable to the first end at a torso joint by a second connection element and a second adjustment mechanism on at least one of the first end of the torso portion and the second end of the torso portion for adjusting a circumferential length of the torso portion;
a connecting strap connecting at least a portion of the collar portion to the torso portion and configured to extend between the front legs of the animal, the connection strap comprising a strap adjustment mechanism for adjusting a longitudinal length of the connection strap; and
a semi-circular protective apron connected to the arcuate lip of the collar portion, the protective apron having an arcuate shape that extends over a portion of a circumference of the collar portion and around a portion of the neck of the animal when worn around the neck of the animal,
wherein the protective apron has a flexible covering extending between a plurality of radially spaced apart flexible reinforcement members,
wherein each of the plurality of reinforcement members is positioned within a pocket formed on the flexible covering, and
wherein, when worn around the neck of the animal, the protective apron is configured to extend from a front portion of the neck of the animal and under a mouth of the animal.

2. The protective animal harness of claim 1, wherein the protective apron is removably connected to the collar portion by a connection mechanism.

3. The protective animal harness of claim 2, wherein the connection mechanism is a hook-and-loop fastener having a first member on the collar portion and a second member on the protective apron.

4. The protective animal harness of claim 1, wherein the first connection element is a clasp, a snap connector, or a hook-and-loop connector.

5. The protective animal harness of claim 1, wherein the second connection element is a clasp, a snap connector, or a hook-and-loop connector.

6. A protective animal collar comprising:
a collar portion having a first end and a second end removably connectable to the first end at a collar joint to define a substantially annular shape with a central opening configured for receiving a neck of an animal; and
a semi-circular protective apron connected to the collar portion, the protective apron having an arcuate shape that extends over a portion of a circumference of the collar portion and around a portion of the neck of the animal when worn around the neck of the animal, wherein the protective apron has a flexible covering extending between a plurality of radially spaced apart flexible reinforcement members, wherein each of the plurality of reinforcement members is positioned within a pocket formed on the flexible covering, and wherein, when worn around the neck of the animal, the protective apron is configured to extend from a front portion of the neck of the animal and under a mouth of the animal.

7. The protective animal collar of claim 6, wherein the protective apron is removably connected to the collar portion by a connection mechanism.

8. The protective animal collar of claim 7, wherein the connection mechanism is a hook-and-loop fastener having a first member on the collar portion and a second member on the protective apron.

9. The protective animal collar of claim 6, wherein the collar joint comprises an adjustment mechanism for adjusting a size of the central opening.

10. The protective animal collar of claim 9, wherein the adjustment mechanism is a hook-and-loop fastener having a first member on the first end of the collar portion and a second member on the second end of the collar portion.

11. The protective animal collar of claim 6, wherein the collar portion is made from a foam material.

12. The protective animal collar of claim 11, wherein the foam material is enveloped in a fabric material.

\* \* \* \* \*